(12) United States Patent
Dickson

(10) Patent No.: US 10,040,708 B2
(45) Date of Patent: Aug. 7, 2018

(54) METHOD FOR TREATING INDUSTRIAL WASTE

(75) Inventor: Michael David Dickson, Rosevears (AU)

(73) Assignee: EVOCRA PTY LIMITED, Tasmania (AU)

( * ) Notice: Subject to any disclaimer, the term of this patent is extended or adjusted under 35 U.S.C. 154(b) by 433 days.

(21) Appl. No.: 14/236,317

(22) PCT Filed: Aug. 3, 2012

(86) PCT No.: PCT/AU2012/000924
§ 371 (c)(1),
(2), (4) Date: Jan. 30, 2014

(87) PCT Pub. No.: WO2013/016775
PCT Pub. Date: Feb. 7, 2013

(65) Prior Publication Data
US 2014/0190896 A1     Jul. 10, 2014

(30) Foreign Application Priority Data
Aug. 3, 2011  (AU) ................... 2011903114

(51) Int. Cl.
*C02F 1/24* (2006.01)
*C02F 1/78* (2006.01)
(Continued)

(52) U.S. Cl.
CPC .............. *C02F 1/5236* (2013.01); *C02F 1/24* (2013.01); *C02F 9/00* (2013.01); *C02F 1/004* (2013.01); *C02F 1/008* (2013.01); *C02F 1/5245* (2013.01); *C02F 1/62* (2013.01); *C02F 1/66* (2013.01); *C02F 1/78* (2013.01); *C02F 2101/20* (2013.01); *C02F 2101/306* (2013.01); *C02F 2101/32* (2013.01); *C02F 2103/10* (2013.01); *C02F 2103/16* (2013.01); *C02F 2209/001* (2013.01); *C02F 2209/003* (2013.01); *C02F 2209/04* (2013.01); *C02F 2209/06* (2013.01)

(58) Field of Classification Search
CPC ..................................... C02F 1/24; C02F 1/78
See application file for complete search history.

(56) References Cited

U.S. PATENT DOCUMENTS 5,053,140 A  *  10/1991  Hurst ................... B01D 36/02
                                                 210/188
5,180,499 A  *   1/1993  Hinson .................... C02F 1/24
                                                 210/706

(Continued)

FOREIGN PATENT DOCUMENTS

| CA | 2427191 | 5/2001 |
|---|---|---|
| JP | H05 195106 | 8/1993 |
| JP | H05 228480 | 9/1993 |

OTHER PUBLICATIONS

Oct. 17, 2012, International Search Report in Application No. PCT/AU2012/000924.

(Continued)

*Primary Examiner* — Thomas M Lithgow
(74) *Attorney, Agent, or Firm* — Neifeld IP Law, PC

(57) ABSTRACT

Disclosed herein is a method for removing contaminants from an industrial fluid waste. The method comprises the steps of ozofractionating the industrial fluid waste, whereby contaminants are oxidised and a foam fractionate is formed; and separating at least a portion of the foam fractionate and any precipitate from the ozofractionated fluid.

13 Claims, 2 Drawing Sheets

(51) Int. Cl.
*C02F 1/52* (2006.01)
*C02F 9/00* (2006.01)
*C02F 1/00* (2006.01)
*C02F 1/62* (2006.01)
*C02F 1/66* (2006.01)
*C02F 101/20* (2006.01)
*C02F 101/30* (2006.01)
*C02F 101/32* (2006.01)
*C02F 103/10* (2006.01)
*C02F 103/16* (2006.01)

(56) References Cited

U.S. PATENT DOCUMENTS

| | | | |
|---|---|---|---|
| 5,638,347 A | 6/1997 | Lindberg | |
| 5,639,347 A * | 6/1997 | Lindberg | D21C 9/1005 |
| | | | 162/29 |
| 6,485,696 B1 * | 11/2002 | Sato | C02F 1/78 |
| | | | 423/127 |
| 7,029,577 B2 | 4/2006 | Cummins | |
| 2008/0023407 A1 | 1/2008 | Eriksson | |

OTHER PUBLICATIONS

Supplementary European Search Report Application No. EP 12819718.
Patent Abstracts of Japan English translation of Abstract for JP H05 195106.
Patent Abstracts of Japan English translation of Abstract for JP H05 228480.
Oct. 17, 2012, International Search Report in Application No. PCT/AU2012/00924.

* cited by examiner

METHOD FOR TREATING INDUSTRIAL WASTE

CROSS REFERENCE TO RELATED APPLICATIONS

This application is a national stage entry of PCT/AU2012/000924, filed Aug. 3, 2012, which claims priority to Australian application 2011903114, filed Aug. 3, 2011, both of which are incorporated herein by reference.

FIELD

The present invention relates to methods for treating industrial fluid wastes.

BACKGROUND

Industrial fluid waste usually requires treatment before it can be safely discharged into the environment. Industrial fluid wastes often contain high amounts of contaminants such as organic compounds and heavy metallic species, and these contaminants need to be removed (or significantly reduced) before the waste is safe for disposal.

For example, acid mine (or metalliferous) drainage (AMD) is an industrial fluid waste that causes significant problems in the mining industry. AMD occurs when sulfide minerals in rocks are exposed to oxidizing conditions, for example, in coal and metal mining, highway construction or other large-scale excavations. There are many types of sulfide minerals, but iron sulfides (common in coal regions), pyrite and marcasite ($FeS_2$) are the predominant AMD producers. Upon exposure to water and oxygen, pyritic minerals oxidize to form acidic, iron and sulfate-rich water.

Existing techniques for treating AMD include exposing the AMD to basic agents such as lime, which raises the pH of the AMD and causes many metallic species to precipitate. The precipitate is then allowed to settle and the treated water decanted. Other techniques, such as that described in U.S. Pat. No. 6,485,696, use ozone to rapidly oxidise specific metallic elements present in AMD. Ozone is bubbled through the AMD, which oxidises the metallic elements and causes them to precipitate. This technique may also involve the step of adding a basic agent to the ozone-treated water to cause other metallic elements to precipitate.

SUMMARY

In a first aspect, the present invention provides a method for removing contaminants from an industrial fluid waste. The method comprises the steps of ozofractionating the industrial fluid waste, whereby contaminants are oxidised and a foam fractionate is formed, and separating at least a portion of the foam fractionate and any precipitate from the ozofractionated fluid.

Ozofractionation is a technique that combines foam fractionation with ozone. Foam fractionation can be used to separate certain species from a fluid by passing a foam through the fluid. Any air/water interface has a small electrical charge and, as foam fractionation creates millions of tiny bubbles, an extremely large air/water interface is created. The corresponding electrical charge is a powerful attractant to dissolved organic molecules, minerals, trace elements and colloidal sized particles. As the electrical charge of an ozone/water interface is significantly greater than that of an air/water interface, the inventor has found that ozofractionation provides a far more aggressive separation and decontamination than traditional foam fractionation. Indeed, the inventor has found that ozofractionation is aggressive enough to oxidise the majority of contaminants typically found in industrial fluid waste. The oxidation power of ozofractionation is many times greater than that which can be achieved by simply bubbling ozone gas through a solution. Furthermore, many contaminants may not precipitate upon exposure to ozone simply bubbled through a solution. However, when exposed to ozofractionation, such contaminants may either precipitate or get caught in the rising foam of ozone and become part of the foam fractionate, which is readily separable from the bulk fluid. Ozofractionation of industrial fluid waste causes more effective precipitation of contaminants than bubbling ozone through the fluid. In addition, during ozofractionation, many other contaminants such as hydrocarbon based compounds (e.g. hydraulic fluids, petroleum based products, etc.) are broken down by the ozone and trapped in the foam.

Ozofractionation has been used for many years in the aquaculture industry, primarily to remove dissolved organics such as fats and oils and debris from an aquarium or pond. The inventor recognised that ozofractionation might also be capable of decontaminating industrial fluid wastes, and has spent a number of years developing ozofractionation systems capable of processing such wastes.

As used herein, the term "industrial fluid waste" will be understood to include fluid wastes produced by industrial processes, including wastes that are contaminated with environmentally degrading levels of toxic elements, minerals or complex volatile organic compounds. Exemplary industrial fluid wastes are organic or inorganic pesticides, fertilisers (nitrogen and phosphorous based) organic pollutants (e.g. volatile organic compounds—VOCs), oil, grease and other petrochemical compounds, acid mine drainage, acid rock drainage or industrial waste water from electrical power plants, steel plants or mines. The term "industrial fluid waste" does not encompass waste produced by domestic processes, such as sewerage, which are generally most effectively treated using organic methods.

In a second aspect, the present invention provides a method for removing dissolved metals from mine waste water. The method comprises the steps of ozofractionating the mine waste water, whereby species containing the metals precipitate, and separating the precipitated metal species from the ozofractionated water.

In some embodiments, the method of the second aspect may comprise a further step in which parameters of the ozofractionated water are monitored and, if necessary, a reagent to adjust pH is added to the ozofractionated water.

In a third aspect, the present invention provides a system for treating acid mine drainage. The system comprises an ozofractionator adapted to receive and ozofractionate the acid mine drainage under conditions determined from measured parameters of the acid mine drainage; a storage tank for receiving the ozofractionated acid mine drainage, whereby metal species that precipitated during ozofractionation are allowed to settle; and means for removing supernatant ozofractionated acid mine drainage from the storage tank and, if measured parameters of the supernatant ozofractionated acid mine drainage are within acceptable environmental limits, discharging the supernatant ozofractionated acid mine drainage. More specific features of the system of the present invention are described below in the context of the methods of the present invention.

BRIEF DESCRIPTION OF THE DRAWINGS

Embodiments of the present invention will now be described by way of example only with reference to the accompanying drawings in which.

DETAILED DESCRIPTION OF THE INVENTION

Figure 1:
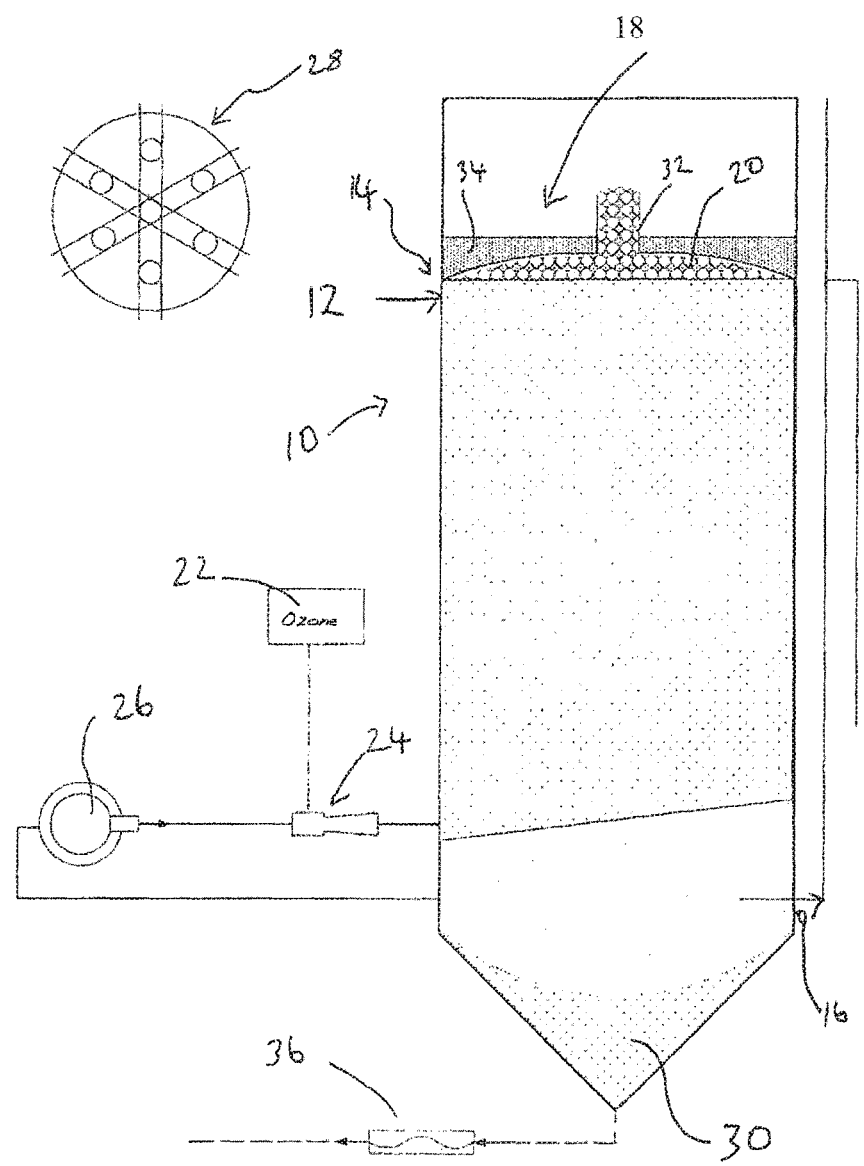
FIG. 1 is a drawing of an ozofractionation chamber for use in an embodiment of the present invention.

The present invention provides a method for removing contaminants from an industrial fluid waste. The method comprises the steps of ozofractionating the industrial fluid waste, whereby contaminants are oxidised and a foam fractionate is formed, and separating at least a portion of the foam fractionate and any precipitate from the ozofractionated fluid.

Ozofractionation combines foam fractionation with the aggressive oxidising properties of ozone. Ozone is a powerful oxidising agent and, under appropriate conditions, will oxidize most metals (except gold, platinum, and iridium) to oxides of the metals in their highest oxidation state. When the ozone is in the form of a foam comprising tiny bubbles comprising ozone, the amount of ozone exposed to the industrial fluid waste is many times greater than that which can be achieved by simply bubbling ozone through the fluid, and ozofractionation therefore provides a much stronger oxidising environment. Thus, exposing an industrial waste fluid containing metallic species (e.g. inorganic compounds or minerals) to ozone causes the metals to be oxidised and the oxidised metal species will typically precipitate. The precipitate can subsequently be either gravity separated, fractionated or mechanically filtered from the fluid.

Ozone will also oxidise most organic compounds (including complex volatile organic compounds). Thus, exposing an industrial waste fluid containing organic compounds to ozone causes the organic compounds to be oxidised and effectively destroyed. Typically, the oxidised remains of the organic compounds either precipitate or become associated with the foam fractionate and hence may be separated from the ozofractionated fluid. As the bubbles comprising ozone are so small, when they float to the top of the industrial fluid waste they remain stable and are able to be separated (along with any contaminants associated with the foam) from the ozofractionated fluid.

Ozone is more soluble in water than oxygen and any residual ozone present in water decays rapidly. Once ozone enters water, it follows two basic modes of reaction: direct oxidation, which is rather slow and extremely selective, and auto-decomposition to the hydroxyl radical. The hydroxyl radical is extremely fast and non-selective in its oxidation of organic compounds. Hydroxide ions are also formed when the ozone enters water and will oxidise certain compounds (e.g. some compounds found in pesticides). If the ozone in the water is exposed to UV light, the proportion of hydroxyl radicals will tend to decrease and the proportion of hydroxide ions increase. Thus, in some embodiments and, depending on the nature of the contaminants in the industrial fluid waste, the bubbles of ozone may be exposed to UV light.

As discussed above, the oxidation power of ozofractionation is many times greater than that which can be achieved by simply bubbling ozone gas through a solution, and the inventor has discovered that ozofractionation can be used to decontaminate many industrial fluid wastes. Indeed, for some industrial fluid wastes, substantially all of the contaminants may be removed by ozofractionation. In some embodiments, however, additional treatment steps may be required before the waste is ready for discharge. Such additional treatment steps will be described in further detail below.

Any industrial waste that is contaminated with a potentially environmentally degrading substance can be treated using the methods of the present invention. Such degrading substances may vary from species with only mild environmental concern to species that, even in extremely low dose, may cause death or are carcinogenic, teratogenic or mutagenic to aquatic invertebrates and vertebrates. Exemplary contaminants that can be removed from industrial fluid waste using the method of the present invention include pesticides, organic pollutants, contaminants associated with acid mine drainage or acid rock drainage, or contaminants typically found in industrial waste water from electrical power plants, steel plants or mines.

In one particular application, the method of the present invention has been used to reduce the amount of the banned pesticide DDT (dichlorodiphenyltrichloroethane) present in industrial waste water. The method of the present invention was used to reduce DDT from 108 parts per billion to <2.0 parts per billion in industrial wastewater, and also used to reduce the amount of DDE (dichlorodiphenyldichloroethylene, which is a metabolite or breakdown product of DDT) in industrial waste water from 9.5 parts per billion to <0.5 parts per billion.

In some embodiments, the industrial fluid waste is ozofractionated by causing a foam comprising ozone to pass through the industrial fluid waste. Typically, the industrial fluid waste is caused to flow through a chamber whilst a foam comprising ozone is caused to rise from a bottom portion of the chamber to a top portion of the chamber.

Depending on the nature of the industrial fluid waste, the foam may either comprise ozone and another gas (e.g. air), or consist only of ozone.

In some embodiments, the industrial fluid waste is caused to flow through a chamber in an opposite direction to a foam comprising ozone that is rising from the bottom portion of the chamber to the top portion of the chamber. Such a counter-current flow enables a longer contact time between the ozone bubbles and the industrial fluid waste because the tiny bubbles become entrained in the flow of the waste, thereby spending more time in contact with the waste, thereby providing more efficient ozofractionation.

The foam comprising ozone may be delivered to the industrial fluid waste using any technique capable of dispersing a foam in a fluid, for example, by venturi injection. Typically, the size of the bubbles comprising ozone delivered into the fluid should be less than or equal to about 200 μm in diameter (e.g. less than or equal to about 150 μm in diameter). The inventor has found that if the bubbles are significantly larger than this they do not tend to form a stable foam on top of the ozofractionated fluid, but can burst and release the trapped contaminants back into the ozofractionated fluid. Further, the larger the bubble, the less ozone that is available to oxidise contaminants in the fluid waste.

In some embodiments, the foam comprising ozone may be exposed to UV light. If so, the UV exposure is typically performed after the foam has been produced in the venturi, but before the foam contacts the industrial fluid waste.

In some embodiments, the method comprises a preliminary step in which parameters of the industrial fluid waste are monitored and used to determine ozofractionation conditions (e.g. length of time of ozofractionation required or quantity of ozone to be added) required in order to effectively remove the contaminants in the industrial fluid waste.

The duration of ozofractionation will depend on the nature of the industrial fluid waste and can be determined empirically. For heavily contaminated wastes, ozofractionation times may be from about 1 hour to about 4 hours (e.g. from about 1 hour to about 3 hours or from about 1 hour to about 2 hours or about 1.5 hours). For lightly contaminated wastes, ozofractionation times may be as little as 30 seconds, but more commonly will be from about 5 minutes to about 45 minutes (e.g. from about 15 minutes to about 35 minutes or from about 20 minutes to about 30 minutes or about 25 minutes). In some embodiments, the industrial fluid waste is ozofractionated for about one hour.

The quantity of ozone required to effectively ozofractionate an industrial waste fluid will also depend on the nature of the industrial fluid waste and can be determined empirically. For heavily contaminated wastes, about 1 to about 4 grams (e.g. from about 1 g to about 3 g, about 2 g to about 3 g or about 2.5 g) of ozone for every kilolitre of industrial fluid waste may be required. For lightly contaminated wastes, about 0.5 to about 1 grams (e.g. from about 0.7 g to about 1 g, about 0.7 g to about 0.9 g or about 0.75 g) of ozone for every kilolitre of industrial fluid waste may be required. In some embodiments, the industrial fluid waste is ozofractionated using about 4 grams of ozone for every kilolitre of industrial fluid waste.

Usually, the source of the industrial fluid waste will be studied to assess the worst case scenario to provide an adequate c.t (concentration×time) of ozone to enable complete oxidisation of all possible contaminates in the waste. As will be appreciated, c.t can be regulated by changing either the ozone concentration or contact time. For example, delivering 4 g of ozone over 1 hour is equivalent to delivering 1 g of ozone over 4 hours or 20 g of ozone over 12 minutes. Thus, the quantity of ozone and contact time can be varied depending on the rate at which the industrial fluid waste requires treatment.

Generally, the c.t for treating a given industrial fluid waste would be sufficient to treat industrial fluid waste containing at least twice the worst case scenario of contaminants. However, the c.t should also control the ozonation as a function of energy efficiency by dosing the lowest possible concentration of ozone to achieve the result while giving capacity to effectively treat twice the strength envisaged as the worst possible scenario.

Any precipitate that forms during ozofractionation should be separated from the fluid. Any such precipitate may, for example, be separated from the ozofractionated industrial fluid waste by allowing the precipitate to settle and decanting the supernatant water. Other methods for separating the precipitate and fluid, such as filtration, could also be used.

In some embodiments, it may be necessary to further treat the ozofractionated fluid before it is safe to discharge into the environment. Such further treatment will depend on the nature of the industrial fluid and its contaminants. Specific further treatments are described below in the context of treating mine waste water, and may be applicable to other industrial fluid wastes.

An embodiment of a system for ozofractionating an industrial fluid waste will now be described with reference to FIG. 1.

In the system depicted in FIG. 1, a column of tiny bubbles is caused to move upwards through a chamber 10 into which a stream 12 of an industrial fluid waste is continuously introduced via an inlet 14 close to the top of the chamber 10 and continuously removed (at the same rate) via an outlet 16 close to the bottom of the chamber 10. The chamber 10 also includes a zone 18 above the surface of the fluid in the chamber where a foam 20 forms and can be removed.

Ozone is generated in an ozone generator 22 and directed into a venturi 24, where it is mixed with fluid pumped from the bottom of the chamber by ozofractionation pump 26. The ozone is vigorously mixed with the liquid in the venturi 24 such that a foam comprising tiny bubbles of ozone are produced. The ozone foam is injected into and distributed relatively evenly across the full cross-sectional area of the chamber 10 via distribution pipes 28 (not depicted in the chamber 10 for clarity).

Once the ozone foam has been injected into the chamber 10, it slowly rises to the surface of the fluid at the top of the chamber 10 and form a foam in the zone 18. As the foam rises, they attract contaminants present in the waste stream 12 and the contaminants thereby come into contact with and are oxidised by the ozone. A majority of the oxidised contaminants then either precipitate out of the solution and start to fall to the bottom of the chamber 10 to join sediment pile 30, or associate with and continue to rise with the ozone foam.

Once the foam bubbles reach the surface of the fluid in the chamber, they float on top of the surface in the zone 18 whilst excess fluid drips from them back into the main body of fluid in the chamber 10. As more foam bubbles reach the surface of the fluid, the lighter foam rises and is directed by foam concentrator 32 into fractionate chamber 34. The foam that reaches fractionate chamber 34 is laden with contaminants and can be disposed of or further processed as necessary.

The precipitate in the sediment pile 30 is periodically pumped out of the chamber using sediment pump 36. The precipitate is laden with contaminants and is disposed of or further processed as necessary.

The fluid removed from the chamber via outlet 16 has been in contact with the ozone foam for enough time to ensure that a significant proportion of the contaminants in the industrial fluid waste introduced into the chamber via inlet 14 have been removed (either via precipitation or the foam).

Relevant parameters to consider during ozofractionation include:

A: Bubble size—the smaller the bubble the higher the charged surface area and the more stable the resultant foam fractionate.

B: Bubble generation method—ideal bubble size is less than or equal to about 200 μm.

C: Ratio of ozone to fluid in the bubble—usually about 13% (v/v) ozone to water, but will vary (downwards) dependent on bubble size. Above 13% the bubbles tend to combine, which reduces the effectiveness of the process.

D: Bubble distribution method—bubbles should be evenly spread into the chamber with emphasis on creating an evenly distributed rising bubble mass in the chamber. If a single bubble source is inadequate to achieve this result, multiple venturis can be used. For instance, a 1.5 m diameter chamber will benefit from 6 venturi sources with internal plumbing that spreads the bubble mass out across the chamber.

E: Ratio of height to width of the chamber—it is important avoid conditions where portions of the industrial fluid waste can avoid contact with the rising bubble mass.

F: Shape of foam chamber and dewatering tower—this is necessary to stabilise the bubble mass such that foam will build up with even the smallest concentrations of contaminate, and at the same time allow excess fluid to drain back downwards leaving a foam that removes the contaminates but not too much fluid. The fractionate collection cup should also hold a stabilised fractionate, where the bubbles have all degraded such that the fractionate is free of air and stable for subsequent removal (e.g. by gravity) to a decant and dewatering process.

G: Flow rate through the chamber—the retention time of the industrial fluid waste in the chamber should be calculated based on the worst case contamination scenario and the highest flow rate of industrial fluid waste. In general, a minimum 1 hour retention is required, but this may be modified (depending on the nature of the contaminants) by increasing or decreasing the amount of ozone injected into the chamber.

In one application, the present invention can be used to remove contaminants from mine waste water (e.g. waste water containing acid mine drainage, acid rock drainage, process water from mill operations or mining vehicle wash down water). The present invention therefore also provides a method for removing dissolved metals from mine waste water. The method comprises the steps of ozofractionating the mine waste water, whereby species containing the metals precipitate, and separating the precipitated metal species from the ozofractionated water.

When waste water from mining operations is ozofractionated, the majority of metallic species present in the water (including species containing metals selected from the following: iron, manganese, silver, nickel, cobalt, bismuth, palladium, thallium, aluminium, zinc, copper, lead, arsenic and chromium, as well as other typical mining based contaminants such as cyanide) are oxidised and subsequently precipitate. Ozofractionation also typically increases the pH of the water, especially when the mine waste water is initially acidic, which may cause previously soluble minerals and the like to precipitate. Thus, ozofractionation and subsequent separation of any precipitate that forms may be sufficient to treat certain types of mine waste water.

In some embodiments, the mine waste water is ozofractionated by causing a foam comprising ozone to pass through the mine waste water. Typically, the mine waste water is caused to flow through a chamber whilst a foam comprising ozone is caused to rise from a bottom portion of the chamber to a top portion of the chamber.

In some embodiments, the mine waste water is caused to flow through a chamber in an opposite direction to a foam comprising ozone that is caused to rise from the bottom portion of the chamber to the top portion of the chamber.

In some embodiments, the foam of ozone is delivered by venturi injection.

In some embodiments, at least a portion of a foam fractionate is removed from the surface of the ozofractionated mine waste water. Such a foam fractionate may include contaminants removed from the mine waste water similar to those discussed above in relation to industrial fluid wastes generally.

In some embodiments, the method may comprise a preliminary step in which parameters of the mine waste water are monitored and used to determine ozofractionation conditions.

The duration of ozofractionation will depend on the nature of the mine waste water and can be determined empirically based on the target c.t for the waste source, as discussed above in relation to industrial fluid wastes generally. For heavily contaminated waste water, ozofractionation times may be up to 2 or 3 or even 4 hours. For lightly contaminated waste water, ozofractionation times may be as little as 30 seconds. In some embodiments, the mine waste water is ozofractionated for about one hour.

The quantity of ozone required to ozofractionate the mine waste water will also depend on the nature of the mine waste water and can be determined empirically based on the target c.t for the waste source, as discussed above in relation to industrial fluid wastes generally. For heavily contaminated waste water, about 4 to about 8 (e.g. about 5, 6, 7 or 8 g) grams of ozone for every kilolitre of mine waste water may be required. For lightly contaminated waste water, about 0.5 to about 3 (e.g. about 1, 2 or 3 g) grams of ozone for every kilolitre of mine waste water may be required. In some embodiments, the mine waste water is ozofractionated using about 4 grams of ozone for every kilolitre of mine waste water.

In some embodiments, the precipitated metal species are separated from the ozofractionated water by allowing the precipitated metal species to settle and then decanting the supernatant ozofractionated liquid.

In some embodiments, ozofractionation may not be sufficient to adequately treat the mine waste water (e.g. the pH of the ozofractionated mine waste water may be not appropriate for discharge into the environment, or the ozofractionated mine waste water may still contain some dissolved metallic species or other contaminants). Thus, some embodiments may comprise an additional step of monitoring parameters of the ozofractionated water and, if certain conditions are met, the ozofractionated water is deemed to require further treatment before discharge. Thus, in some embodiments, it may be necessary to add a further treating agent or agents (e.g. a pH adjusting agent and/or a binding agent) to the ozofractionated water. Alternatively (or in addition), some embodiments may comprise an additional step of exposing the ozofractionated water to UV light, which can destroy some contaminant found in the mine waste water.

Mine waste water may be acidic, basic or neutral. For example, the condition of water quality from underground mines, or backfills of surface mines, is dependent on the acid-producing (sulfide) and alkaline (carbonate) minerals in the disturbed rock. In general, sulfide-rich and carbonate-poor materials produce acidic drainage (e.g. AMD). In contrast, alkaline-rich materials, even with significant sulfide concentrations, often produce alkaline conditions in water.

Increasing or decreasing the pH of a solution using a pH adjusting agent is another technique by which species in solution may be caused to precipitate. For example, in the case of AMD, increasing the pH to between about 8.5 to about 9.5 will cause many metallic species to precipitate and thereby be separable. Thus, changing the pH of the ozofractionated water may cause precipitation of additional contaminants that may still be present in the water post ozofractionation.

In embodiments where the mine waste water post ozofractionation is acidic and it is desirable to increase the pH, the pH adjusting agent would be a basic agent. In embodiments where the mine waste water is basic post ozofractionation and it is desirable to decrease the pH, the pH adjusting agent would be an acidic agent. In embodiments where the mine waste water is neutral post ozofractionation, either a basic or acidic agent could be used.

Exemplary basic agents include limestone, $CaCO_3$, hydrated lime, $Ca(OH)_2$, un-hydrated (quick) lime, CaO, soda ash, $Na_2CO_3$, caustic soda, NaOH, magna lime, MgO, hydrated potassium aluminium sulphide, red mud and products sold under the brand name ViroMine™ Technology.

Exemplary acidic agents include hydrochloric acid, $CO_2$ and products sold under the brand name ViroMine™ Technology.

In some embodiments, the further treating agent is a binding agent capable of sequestering metal species present in the waste water (e.g. that precipitate when the pH adjusting agent is added). Such binding agents are advantageous because they can sequester mineral content into a stable matrix safe for land fill. Without such sequestration, metal species in the landfill may still be free to migrate, for example, by leeching out when exposed to rainwater or the like.

In some embodiments, the further treating agent is capable of both adjusting the pH and binding precipitated metal species. For example, agents capable of sequestering mineral content into a stable matrix safe for land fill and adjusting the pH of a solution to which they are added are sold by Virotec Global Solutions Pty Ltd under the trade name ViroMine™ Technology. The ViroMine™ Technology products are based on red mud, the by-product of bauxite processing in the Bayer process, and are a non-hazardous, non-dangerous environmental remediation technology derived from alumina refinery residues.

As it is significantly alkaline, most ViroMine™ Technology products raise pH (the pH of red mud is 10-15). In raising pH, certain elements are caused to precipitate out of solution. In addition, ViroMine™ Technology provides a type of absorptive sponge that sequesters precipitated metal species in a stable matrix. The resultant settled sludge is therefore stable and safe for disposal to land fill. ViroMine™ Technology includes five reagents:
 a) Neutra B—a reagent designed to treat mildly acidic (pH 6-8) water contaminated with heavy metals, particularly arsenic and selenium;
 b) Acid B—a reagent designed to treat acidic (pH 4.5-6) water contaminated with heavy metals;
 c) Acid B Extra—a reagent designed to treat highly acidic (pH<4.5) water contaminated with heavy metals;
 d) Terra B—a reagent designed to treat sulphidic waste rock and soil; and
 e) Alka B—a reagent designed to treat alkaline (pH>7) water contaminated with heavy metals.

In some embodiments, a basic agent, if added, causes the pH of the ozofractionated water to become between about 8.5 and about 9.5. This pH is sufficient to cause precipitation of many metallic species often present in AMD which may have survived the ozofractionation step.

In some embodiments, the parameters of the ozofractionated water that are monitored to decide whether a further treating agent is required include the pH and the oxidation reduction potential (ORP) of the ozofractionated water. Such parameters are indicative of the suitability of the ozofractionated water for disposal into the environment. Other parameters that could be monitored include flow volume, total suspended solids or turbidity (TSS), total dissolved solids (TDS), conductivity, temperature, dissolved oxygen (DO), as well as the concentrations of ammonium, nitrate and chloride.

In embodiments where the mine waste water being treated is AMD, the basic agent and/or binding agent is typically added to the ozofractionated water if the pH of the ozofractionated water is less than about 8.5 and the ORP of the ozofractionated water is greater than about 400.

In some embodiments, the method comprises the further step of separating any metal species that precipitate when the pH adjusting agent is added (as well as any other precipitates that may form at this pH). For example, the ozofractionated water may be held in a storage vessel when the pH adjusting agent is added. The precipitated metal species may then be separated from the treated water by allowing the precipitated metal species to settle and subsequently decanting the supernatant neutralised water.

Alternatively, the ozofractionated water may be held in a fluidized bed filtration reaction vessel when the pH adjusting agent (and other agents, if required) is added. The length of time for which the ozofractionated water needs to remain in the fluidized bed filtration reaction vessel will depend on the nature of the waste being treated, and can be determined empirically. In yet other embodiments, other reagent contact methods appropriate to achieve the desired outcome may be used.

In the method for removing dissolved metals (as well as other species, as discussed above), the supernatant ozofractionated water and/or the supernatant treated water may define a treated water outflow, which is ready for disposal into the environment. In some embodiments, the method comprises the further step of filtering the treated water outflow in order to remove any precipitate that did not settle.

The pH of the treated water outflow will depend on control conditions permitted by a regulatory authority such as the Environmental Protection Agency (EPA) in Australia. The regulatory authority may in addition set upper limits of pH control for a particular site. Typically, the pH of the treated water outflow is between about 8.5 and about 9.5.

The concentration of dissolved metals in the treated water outflow will vary depending on the species, but will be lower than that required by the regulatory authority.

The present invention may also be used to remediate legacy sources of potentially contaminated materials such as stockpiled mine tailings. Current issues facing the industrial and mining industries not only include treating new contaminated sources but also remediating legacy sources, many of which are simply precipitated heavy sludges that are unstable in form and easily re-dissolved into solution and therefore an existing environmental threat. Legacy sources include the leechings from tailing dams and encapsulated rock wastes. Such materials are often exposed to the environment where contaminants can leech from when exposed to water (e.g. rain water or floodwater).

Figure 2:
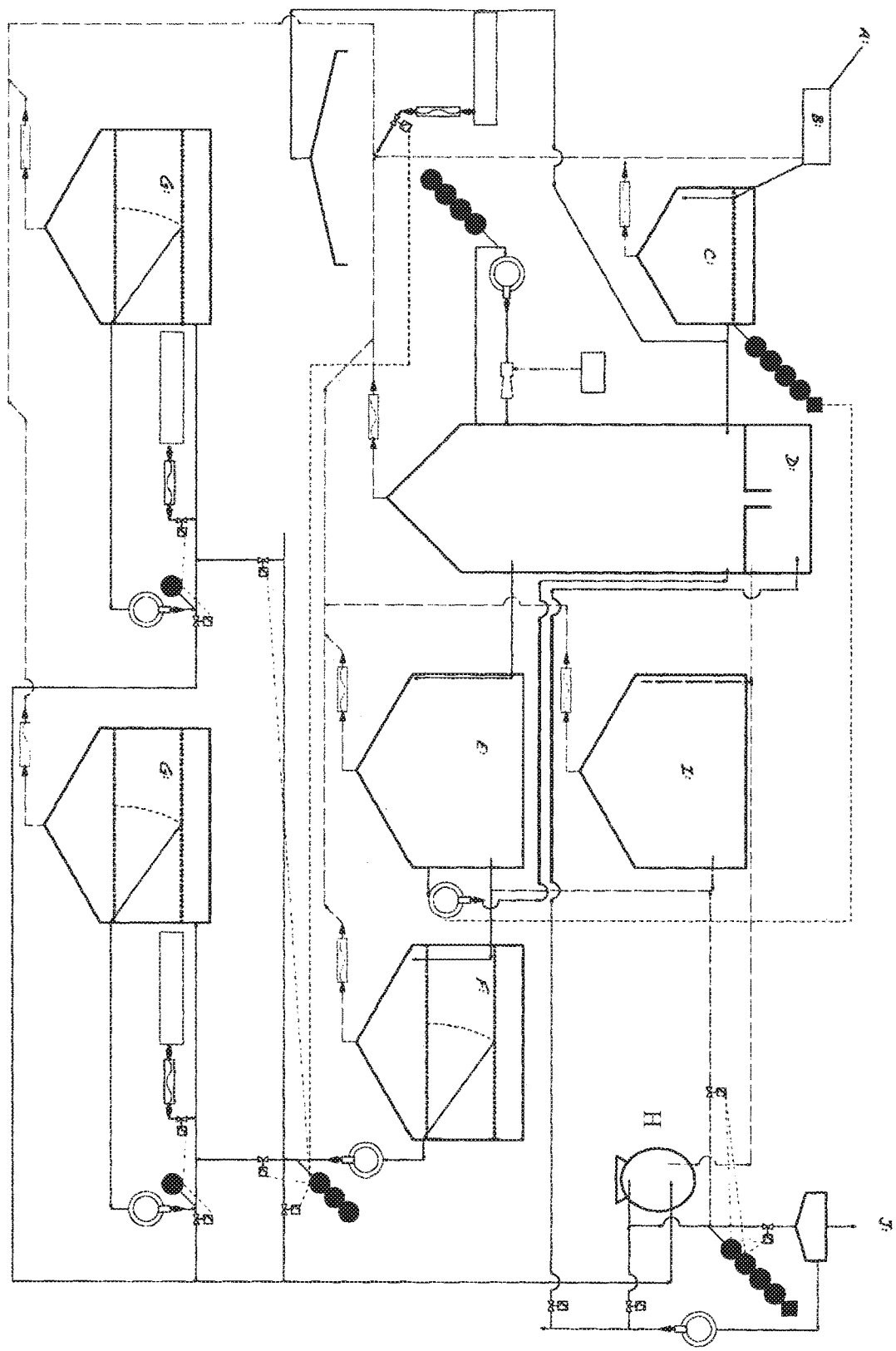
FIG. 2 is a process flow diagram depicting an embodiment of the present invention for treating acid mine drainage.

An embodiment of the method of the present invention in which acid mine drainage is treated will be described in detail below with reference to the flow diagram shown in FIG. 2.

Step A: Source Acid Mine Drainage

As described above, acid mine (or metalliferous) drainage (AMD) forms when sulfide minerals in rocks are exposed to oxidizing conditions in coal and metal mining, highway construction, and other large-scale excavations. A waste stream containing AMD is arranged to flow into the treatment plant, for example, by pumping or under the action of gravity.

Step B: Screening

Before entering the treatment plant, the AMD stream is first screened to remove rocks and other damaging debris from the AMD stream. Usually this consists of a screened containment surrounding the AMD delivery pump, in combination with a 1-2 mm screen post pump.

Step C: Heavy Gravity Separation

Ideally, relatively large particles suspended in the AMD stream (which has passed through the screen B) are separated from the stream prior to the treatment process commencing. This settling can be caused to occur by allowing the AMD to reside in a gravity separation vessel for a period of time. Heavy gravity separation may be allowed to occur in a settlement tank, hydrocyclone or even in a sump.

The AMD stream flows from the heavy gravity separation step to the next stage (ozofractionation) past one or more meters adapted to monitor parameters of the AMD. The parameters monitored are usually flow, pH and total suspended solids or turbidity (TSS), but oxidisation reduction potential (ORP), total dissolved solids (TDS), conductivity, temperature, dissolved oxygen (DO), ammonium, nitrate and chloride could also be monitored. The monitored parameters are observed and usually logged, and used to determine the treatment conditions in later stages in the process.

Flow through the system is usually controlled by the length of time required for the heavy gravity separation to finish. In the event of flow from this step being ≤50% of the design flow, the recirculation loop from E: Settlement/Decant to D: Ozofractionation can be activated and thereby continuously reprocess and improve the quality of that water before transferring to G: Process Batch.

Step D: Ozofractionation

As discussed above, ozofractionation combines foam fractionation with ozone. In this step, any element that can be oxidized is oxidised, usually resulting in soluble elements becoming insoluble and enabling them to be either gravity separated, fractionated or mechanically filtered. These oxidised metal species either precipitate from the solution or get caught in the ozone foam and carried to the top of the AMD in the ozofractionation chamber with the foam fractionate.

Ozone will also oxidise many non-metal species present in industrial waste fluids such as AMD. These oxidised species will also typically either precipitate from the solution or (more commonly) be carried to the top of the AMD with the foam fractionate.

During ozofractionation, the AMD stream is monitored for ORP, Conductivity, pH, DO and TSS. pH≥6, ORP<350 and conductivity at set points relevant to the waste stream will trigger a watch event against the same levels in E: Settlement and Decant. Conductivity set points will depend on the minerals specific to the AMD waste stream and need to be defined against the mine conditions. These levels are typical of a non-AMD source, such as ground and storm water or an exposed aquifer. Typically AMD will have a pH<6, ORP>400 and high conductivity.

Flow in the ozofractionator is from the top of the chamber to the bottom. Ozone foam is delivered by venturi injection at the bottom of the chamber. The resultant rising bubble column creates counter-current flow characteristics that enable an extended contact time between the ozone foam and the AMD. The required ozone concentration and contact time (c.t) to oxidise sufficient species will depend on the properties of the AMD, but the contact time will usually be between about 30 seconds and about 4 hours and the amount of ozone will usually be between about 0.5 grams and about 4 grams of ozone per kL AMD treated.

Ozone is typically mixed with air before delivery into the AMD stream. The ozone concentration in the gas bubbles delivered to the ozofractionation chamber may be as low as 500 mg per cubic meter of air to as much as 22 grams or more of cubic meter of air applied. The required c.t and management of it will depend heavily on the flow rate of the AMD stream (higher flow rates require higher ozone dose rate because they necessarily have a lower contact time, whereas lower flow rates can achieve the same c.t with a lower does of ozone and an extended contact time).

The fractionate forms at the top of the ozofractionation chamber and passes to the fractionate collection cup via the dewatering tower. Fractionate is delivered from the fractionate collection cup to I: Fractionate/settled solids & backwash decant/settlement tank.

From near the base of the ozofractionation chamber, the process fluid flows in a continuous process to the base of the E: Settlement/Decant vessel. Settled sediments are periodically removed from the base of the ozofractionation chamber to K: Dewatering stock pile.

Step E: Settlement/Decant

The settlement/decant vessel allows the species that precipitated during ozofractionation to settle. The ozofractionated AMD flows into the bottom of this vessel, where the precipitate can settle at the bottom. Once the water in the vessel reaches a certain height, it can overflow into the F: Batch balancing vessel, which enhances the efficiency of TSS removal. In smaller plants, E and F may be combined.

Settled sediments are periodically removed from the base of the settlement/decant vessel to K: Dewatering stock pile.

Step F: Batch Balancing

The batch balancing vessel accepts the water decanted from the settlement/decant vessel and operates between high and low water levels to deliver a batch of water for further processing. If the process water of a particular batch in the batch balancing vessel has pH>8.5, ORP<400 or conductivity at a predetermined level relevant to the waste stream, then the waste stream is deemed to have been sufficiently treated, with no further chemical treatment required, and the batch of process water is pumped directly to H: Fines Filtration.

In such cases, the AMD treatment process can be run at a faster rate than is possible if further chemical treatment is required. For example, in the event of ground and storm water or aquifer breach events, the process has the flexibility to allow greater flow through the process because the ORP or conductivity parameters are low. Generally the higher the quality of the AMD being treated, the faster the rate it can be processed.

However, if the water in the batch vessel has pH<8.5, ORP>400 or conductivity at a predetermined level relevant to the waste stream, then further chemical treatment is required and the water in the batch balancing vessel is batched to G: process batch.

Settled sediments are periodically removed from the base of the batch balancing vessel and transferred to K: Dewatering Stock Pile.

Step G: Process Batch

In this vessel, the process water is dosed with a pH adjusting agent, which causes many of the soluble minerals remaining in the process water to precipitate, and, if necessary, a binding agent which sequesters metal species. The process batch vessel is batch filled with the water from the batch balancing vessel, dosed with the pH adjusting agent and the mixture thoroughly mixed for about four hours. The batch is then allowed to settle for a minimum of 20 hours before it is decanted to H: Fines Filtration.

Typically, the AMD will be acidic, and the pH adjusting agent will be a basic agent.

The pH adjusting agent may also be capable of sequestering mineral content into a stable matrix safe for land fill. As discussed above, such reagents are sold by Virotec Global Solutions Pty Ltd under the trade name ViroMine™ Technology. Alternate reagents that can be used to increase the pH of the process water or cause flocculation include lime, hydrated lime, hydrated potassium aluminium sulphate (alum). Direct addition of red mud is also possible.

The number of process batch vessels will depend on the volume of AMD to be treated, with a recommended batch total holding capacity of at least 150% of anticipated AMD flow. Settlement is extended in relation to plant inflow to allow for efficient decant process. The longer the settlement time in the process batch vessels, the longer the fine filtration maintenance interval will be, as less suspended solids are carried over to H: Fines Filtration.

As noted above, this step could also be conducted in a fluidized bed filtration reaction vessel, or other reagent contact method appropriate to achieve the desired outcome.

Settled sediments are periodically removed from the base of the Process Batch vessel(s) to K: Dewatering stock pile.

Step H: Fines Filtration

Fines filtration removes any remaining suspended solids in the treated AMD stream. Most methods of fines filtration are acceptable, but will depend on screening size and desired or permit controlled outcome. Hydrocyclone, Sand Filters, Membranes and Reverse Osmosis, systems are all acceptable technology.

For example, deep bed rapid sand filtration will reliably filter to 5 µm. This can be used if TSS is only required to be <30 mg/L and screening size studies show the suspended solids to be 95% above the 5 µm size. If TSS<10 mg/L, then a combination of deep bed rapid sand filtration and membrane filtration may be used to achieve better than 1 µm. It is feasible to use Reverse Osmosis to filter the treated water for an even more stringent control requirement.

Typically, Step H: Fines filtration will be an automated backwashing deep bed rapid sand filtration system that backwashes on both TSS non-compliance or increase pressure on the feed to the filter. Backwash is directed to Step I: Fractionate, Settled Solids & Backwash Decant/Settlement, where it is able to settle and decant.

Discharge control parameters are monitored immediately post fines filtration. If control parameters are met, the waste stream is discharged to J: Discharge. However, if control parameters not met, discharge is redirected to G: Batch Balancing for re-treatment.

Typical control parameters will be pH and TSS, but may include DO, conductivity, ORP or other parameters required by the regulatory requirements of the site.

Step I: Fractionate, Settled Solids & Backwash Decant/Settlement

This vessel has waste delivered to the base of the vessel, where heavy sediments are encouraged to settle. The vessel may include baffles to assist this process or may be very deep. Decant from the top of this vessel overflows to the discharge of E: settlement/decant, where it combines with decanted water from that vessel to be batched to treatment from F: batch balancing.

Settled sediments are periodically removed from the base of this vessel and transferred to K: dewatering stock pile.

Step J: Discharge

Discharge to the environment must be accomplished in an environmentally sensitive manner. It is therefore preferable to discharge high volumes of treated water into a trench system to minimise point source erosion. The discharge can be into a creek, river or lake or into a stormwater system. The treated water is suitable for irrigation and may be used to water sports fields or parks.

The discharge line system may also include a small storage vessel for use in the plant for wash downs, backwash etc.

Step K: Dewatering Stock Pile

All vessels that have settlement are arranged such that settled solids are periodically removed to the dewatering stock pile. This can be accomplished with progressive cavity sludge pumps, dewatering compression belts, screws or other dewatering transfer methods. The dewatering stock pile is bunded and drained such that fluids captured from this stage are transferred to the delivery line of D: Ozofractionation, for re-treatment. The sediments may require dosing with a binding agent (e.g. Terra B from ViroMine™ Technology), especially if the process has been accelerated (i.e. the only chemical treatment was ozofractionation). When the sediments become dewatered they can be removed to land fill, stock pile or to mill operations, where they can be further processed if desired (e.g. to retrieve minerals from the settled sediments).

As will be appreciated, the process described above allows stringent control of pH, conductivity, TSS and other parameters in AMD treatment in a semi-continuous batch process. The process uses intensive control and dosing techniques with the oxidative properties of ozofractionation and, optionally, various neutralising agents including reagents produced from the Bauxaul process (red mud). The process is capable of distinguishing between heavily degraded AMD, ground and stormwater and aquifer flows and can vary the treatment method as necessary.

It will be understood to persons skilled in the art of the invention that many modifications may be made without departing from the spirit and scope of the invention.

It is to be understood that any prior art publication referred to herein does not constitute an admission that the publication forms part of the common general knowledge in the art.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for removing dissolved metals from mine waste water, comprising:
   ozofractionating mine waste water, whereby a size of bubbles comprising ozone delivered into the mine waste water is less than or equal to about 200 µm in diameter, and
   precipitating said dissolved metals; and
   forming a foam containing at least a portion of said precipitated metals; and
   separating the precipitated metals from the ozofractionated water by removing the foam containing said portion of said precipitated metals.

2. The method of claim 1, wherein the mine waste water is ozofractionated by causing a foam comprising ozone to pass through the mine waste water.

3. The method of claim 1, wherein the mine waste water is caused to flow through a chamber from a top portion of the chamber to a bottom portion of the chamber whilst a foam comprising ozone is caused to rise from the bottom portion of the chamber to the top portion of the chamber.

4. The method of claim 1, wherein at least a portion of a foam fractionate formed during ozofractionation is removed from the surface of the ozofractionated water.

5. The method of 1, comprising a preliminary step of monitoring parameters of the mine waste water and using the parameters to determine ozofractionation conditions.

6. The method of 1, wherein the precipitated metal species are separated from the ozofractionated water by allowing the precipitated metal species to settle and decanting the supernatant ozofractionated water.

7. The method of 1, comprising a further step of monitoring parameters of the ozofractionated water and adding a further treating agent to the ozofractionated water.

8. The method of claim 7, wherein the further treating agent is a pH adjusting agent.

9. The method of claim 8, wherein the pH adjusting agent is a basic agent.

10. The method of claim 7, wherein the further treating agent sequesters metal species that precipitate when the pH adjusting agent is added.

11. The method of claim 7, wherein the further treating agent causes the pH of the ozofractionated water to become between about 8.5 and about 9.5.

12. The method of claim 7, wherein the parameters of the ozofractionated water that are monitored include the pH and the oxidation reduction potential (ORP) of the ozofractionated water.

13. The method of claim 7, further comprising separating metal species that precipitate when the further treating agent is added.

* * * * *